July 30, 1968  E. G. CURTINDALE  3,394,613

STEERING COLUMN MOUNTING BRACKET ASSEMBLY

Filed Sept. 28, 1966

INVENTOR.
Edward G. Curtindale
BY
D. L. Ellis
ATTORNEY

United States Patent Office 3,394,613
Patented July 30, 1968

3,394,613
STEERING COLUMN MOUNTING
BRACKET ASSEMBLY
Edward G. Curtindale, Saginaw, Mich., assignor to General Motors Corporation, Detroit, Mich., a corporation of Delaware
Filed Sept. 28, 1966, Ser. No. 582,742
6 Claims. (Cl. 74—492)

This invention relates generally to vehicle steering assemblies and more particularly to an improved mounting bracket assembly for vehicle steering columns.

One feature of this invention is that it provides an improved steering column mounting bracket assembly for firmly and rigidly supporting the steering column within the vehicle body in normal use yet allowing full and efficient release of the column from the supporting structure of the body under predetermined force loading on the column. Another feature of this invention is that it provides a mounting bracket assembly permitting release of the steering column from the supporting structure under force loading on the column in one direction but preventing displacement of the column relative to the supporting structure in an opposite direction. A further feature of this invention is that it provides a releasable mounting bracket assembly for a collapsible steering column including a bracket member attached to the steering column, and support structure engaging pads or inserts releasably mounted to the bracket and secured to the steering column support structure of the vehicle body in a manner providing rigid support for the column in normal use, yet allowing release of the bracket and the steering column from the inserts for collapsing movement of the steering column free of interference with the support structure of the body. Other features of the invention reside in the use of shearable connectors joining the inserts and the bracket member and set for failure at a predetermined force loading on the steering column, and further in certain aspects of construction of the inserts providing firm supporting association with the bracket yet allowing efficient release thereof.

These and further features and advantages of the invention will be readily apparent from the following specification and the drawings wherein.

Figure 1:
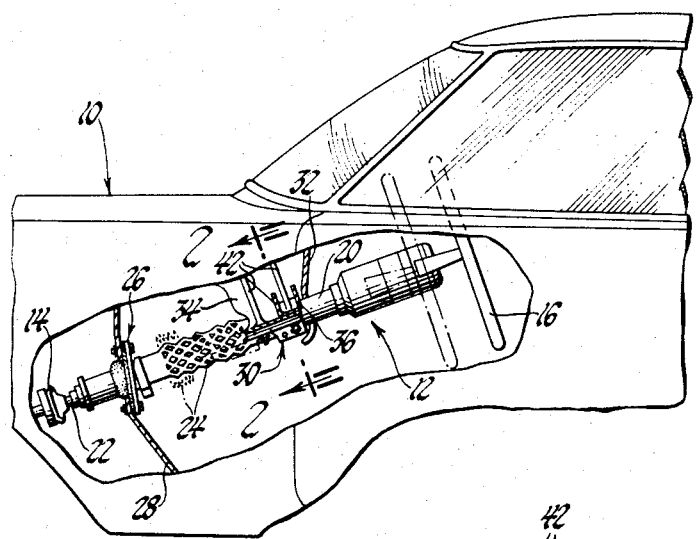
FIGURE 1 is a fragmentary partially broken away elevational view of a vehicle body including a collapsible steering column and a mounting bracket assembly according to this invention therefor.

Referring now particularly to FIGURE 1 of the drawings, there is shown mounted within a vehicle body 10 a collapsible steering column assembly 12 extending from a connection with a flexible coupling 14 associated with the vehicle steering gear, not shown, rearwardly into the passenger compartment of the vehicle and mounting therein a steering wheel 16. For the details of the type of collapsible steering column shown, reference may be had to the copending Wight et al. application Ser. No. 546,312, assigned to General Motors Corporation. Generally, however, the steering column includes an outer mast or support jacket 20 rotatably supporting therewithin a telescopic steering shaft, indicated at 22, extending between flex coupling 14 and steering wheel 16, and a telescopic transmission selector shift tube, not shown. In the event of a predetermined axial force loading on the column, an energy absorbing section 24 of mast jacket 20 allows axial collapse of the various columnar parts and absorbs energy of the axial force loading to impart controlled resistance to such collapse. The lower end of mast jacket 14 extends through the fire wall structure 28 of body 10 and is secured against displacement relative thereto in either axial direction by a restraining toe plate assembly 26. Reference may be had to the above-noted application Ser. No. 546,312 for the details of this plate assembly. A mounting bracket assembly 30 according to this invention is provided to releasably mount the upper end of steering column 12 to the body.

As seen in FIGURE 1, the instrument panel structure of the body includes a face panel 32 extending transversely generally between the front door hinge pillars of the body, a reinforcing brace member 34 extending generally downwardly and rearwardly from structural connection at its upper end to the fire wall and cowl or plenum structures of the body, and a reinforcing transverse channel member 36 joined at its opposite ends with the opposite hinge pillar structures and intermediate its ends with the member 34. As seen best in FIGURE 2, member 34 includes a pair of opposite generally flat flange portions 38 and 40 apertured to receive threaded ends of a number of hanger bolts 42 secured at their upper ends to the cowl structure of the body.

Figure 2:
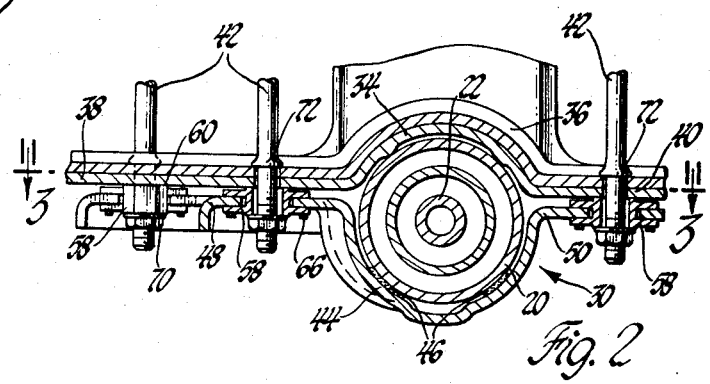
FIGURE 2 is an enlarged sectional view taken generally along the plane indicated by lines 2—2 of FIGURE 1.
Figure 3:
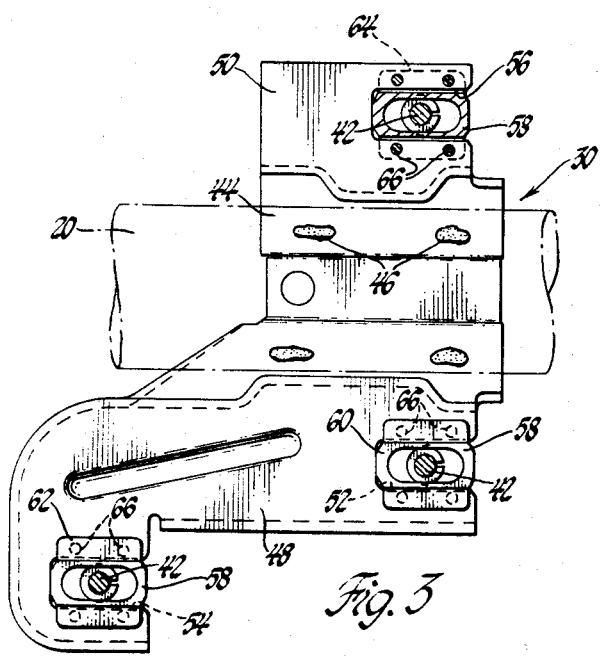
FIGURE 3 is a partially broken away sectional view taken generally along the plane indicated by lines 3—3 of FIGURE 2.
Figure 4:
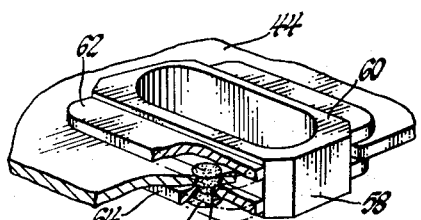
FIGURE 4 is an enlarged perspective view.

As seen best in FIGURES 2 and 3, a mounting bracket 44 includes a central portion which is generally U-shaped in section to overlie and embrace a portion of mast jacket 20 and which is welded or otherwise suitably attached thereto as at 46. From this central portion there extends a pair of flanges 48 and 50, flange 48 having in its main portion an open-ended slot 52 and in an extension therefrom a similar slot 54, and flange 50 having a single open-ended slot 56. Inserted in each of the slots 52, 54, and 56 is a mounting pad 58 preferably of die cast aluminum or similar construction and centrally apertured to receive a respective one of the hanger bolts 42. As seen in FIGURE 4, a face portion 60 of each pad 58 is raised well above the adjacent flange surface of bracket 44 and flushly engageable with the member 34 to hold the bracket spaced from member 34 when assembled thereto. Opposite edges of each pad 58 are grooved to define opposite pairs of upper and lower flanges 62 and 64 respectively which pairs each slidably yet firmly embrace a respective edge of the bracket 44 defining the slots 52, 54, and 56 therein. For each pad 58, a set of four shearable connectors 66 of thermoplastic or similar moldable material are injection molded each into aligned apertures in the lower flange 64 of the pad and in the bracket 44 to releasably secure the pads in the bracket. Each connector 66 includes a reduced portion 68 shearable under predetermined axial force loading in a forward direction on steering column 12 and accordingly on bracket 44. In installation of steering column 12 within the body 10, the steering column is placed to have the hanger bolts 42 received within the various pads 58 and to have the pads engaged with member 34, whereupon nuts 70 are threaded over hanger bolts 42 to rigidly secure the pads and member 34 together between the nuts and shoulders 72 of the bolts.

From the foregoing, it is apparent that in the event of a predetermined axial force loading on steering column 12 in a forward direction sufficient to shear connectors 66, the bracket 44 and steering column 12 may immediately release from the various pads 58, the hanger bolts 42 and the associated supporting members of the instrument panel structure of the body by relative movement of the pads out of the open-ended slots of the bracket. Steering column 12 is thus allowed to axially displace or collapse and the energy absorbing section 24 allowed to absorb energy for control of such collapse. Should the axial force loading on steering column 12 be applied rearwardly, as from the steering gear, it is seen that the bracket 44 is prevented from moving rearwardly relative to pads 58 and hanger bolts 42, except to the extent of bottoming of the bolts within the elongated apertures of the pads, whereby the bracket derives reaction in the instrument panel structure of the body to such rearward force loading to prevent rearward movement of the steering column toward the vehicle occupants.

With the opposed flanges 62 and 64 of the pads 58 firmly embracing the bracket 44, and with the various pads 58 being securely tightened against the member 34 by the bolts 42 and nuts 70, it is seen that the bracket and steering column 12 are firmly held and supported on the instrument panel structure against play or vibration in normal use conditions. The tightening of nuts 70 on bolts 42 over the various pads 58 of course does not cause any increased frictional engagement between the pads and the barcket. While the various pads are firmly embraced on the bracket for the required supporting association therebetween, this fit is not so tight as to present any appreciable resistance to relative sliding movement of the pads out of the bracket following shear of connectors 66. The displacement or traversal of the pads over the bracket during steering column collapse is at a minimum, and during such traversal the bracket 44 meets no binding interference with adjacent instrument panel structure. Thus, the mounting bracket assembly of this invention improves over prior mounting arrangements having the steering column and bracket in direct sliding frictional contact with the support structure as well as those having direct fastening between the hanger bolts and the bracket, and those having the bracket fixedly secured to the support structure so as to be subject to continuous frictional or binding contact with the collapsing column.

Having thus described the invention, what is claimed is:

1. In a vehicle having steering column support structure and a steeing column mountable on said suport structure, steering column mounting means, comprising, bracket means secured to said steering column, support structure engaging means releasably mounted to said bracket means, and means fastening said engaging means to said support structure for support of said bracket means thereon, said bracket means being releasable from said engaging means for movement of said steering column and said bracket means as a unit relative to said engaging means and said support structure.

2. Steering column mounting means as recited in claim 1 wherein said engaging means includes shearable connecting means connected to said bracket means.

3. Steering column mounting means as recited in claim 1 wherein said engaging means includes a mounting pad releasably mounted to said bracket means and adapted to be rigidly fastened to said support structure.

4. Steering column mounting means as recited in claim 3 wherein said mounting pad is slidably received in an open-ended slot of said bracket means.

5. Steering column mounting means as recited in claim 4 wherein said mounting pad includes a portion adapted to be intermediate said bracket means and said support structure and adapted to locate said bracket means spaced from said support structure.

6. Steering column mounting means as recited in claim 4 wherein said mounting pad has opposed edge portions thereof firmly embracing the opposed edges of said bracket means forming said slot.

References Cited
UNITED STATES PATENTS 2,469,075  5/1949  Paun _____ 74—492
2,895,345  7/1959  McClure _____ 74—493

MILTON KAUFMAN, *Primary Examiner.*